(12) United States Patent
Jiang et al.

(10) Patent No.: US 9,077,937 B2
(45) Date of Patent: Jul. 7, 2015

(54) METHOD AND APPARATUS FOR FAST CHANNEL CHANGE

(75) Inventors: Hong Jiang, Warren, NJ (US); Kim N. Matthews, Watchung, NJ (US); Paul Albin Wilford, Bernardsville, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1361 days.

(21) Appl. No.: 12/266,268

(22) Filed: Nov. 6, 2008

(65) Prior Publication Data

US 2010/0111197 A1      May 6, 2010

(51) Int. Cl.
| | |
|---|---|
| H04N 7/12 | (2006.01) |
| H04N 5/50 | (2006.01) |
| H04L 1/00 | (2006.01) |
| H04N 21/438 | (2011.01) |
| H04N 19/177 | (2014.01) |
| H04N 19/39 | (2014.01) |

(52) U.S. Cl.
CPC ............... H04N 5/505 (2013.01); H04L 1/007 (2013.01); H04L 1/0071 (2013.01); H04N 21/4384 (2013.01); H04N 19/177 (2014.11); H04N 19/39 (2014.11)

(58) Field of Classification Search
CPC .. H04N 19/39; H04N 21/4384; H04N 19/177
USPC ........... 375/240.12, 240.23, 240.26; 348/723; 714/776; 725/120
See application file for complete search history.

(56) References Cited

U.S. PATENT DOCUMENTS

| | | | |
|---|---|---|---|
| 6,259,739 B1 * | 7/2001 | Kondo | 375/240.23 |
| 6,570,922 B1 * | 5/2003 | Wang et al. | 375/240.12 |
| 6,704,359 B1 * | 3/2004 | Bayrakeri et al. | 375/240.12 |
| 8,054,883 B2 * | 11/2011 | Filippini et al. | 375/240.16 |
| 8,245,264 B2 * | 8/2012 | Toebes et al. | 725/120 |
| 2002/0118295 A1 | 8/2002 | Karczewicz | |
| 2005/0024543 A1 * | 2/2005 | Ramaswamy et al. | 348/723 |
| 2006/0064727 A1 | 3/2006 | Cho | |
| 2008/0123752 A1 * | 5/2008 | Chen | 375/240.26 |
| 2008/0172593 A1 * | 7/2008 | Rainish et al. | 714/776 |

FOREIGN PATENT DOCUMENTS

| | | |
|---|---|---|
| EP | 1 928 116 A2 | 6/2008 |
| JP | 2003-304510 | 10/2003 |
| JP | 2006-229463 A | 8/2006 |
| WO | WO 2004/114667 A1 | 12/2004 |

(Continued)

OTHER PUBLICATIONS

Marta Karczewica and Ragip Kurceren, The SP- and SI-Frames Design for H.264/AVC, IEEE Transactions on Circuits and Systems for Video Technology, vol. 13, No. 7, Jul. 2003, pp. 637-644.

(Continued)

*Primary Examiner* — Mark Rinehart
*Assistant Examiner* — Gbemileke Onamuti
(74) *Attorney, Agent, or Firm* — Wall & Tong, LLP

(57) ABSTRACT

Providing a fast channel change function in a digital television system by hierarchically modulating each channel to provide both high priority (long interleave) and low priority (short interleave) signals, wherein a receiver may rapidly demodulate and use information within the low priority signal of a new channel to more rapidly change to the new channel.

33 Claims, 4 Drawing Sheets

(56) References Cited

FOREIGN PATENT DOCUMENTS

| WO | WO 2006/016950 A1 | 2/2006 |
| WO | WO 2007/038726 A2 | 4/2007 |

OTHER PUBLICATIONS

ETSI EN 300 744 V1.5.1 (Nov. 2004), European Standard (Telecommunications series), Digital Video Broadcasting (DVB); Framing structure, channel coding and modulation for digital terrestrial television, European Broadcasting Union, pp. 1-64.

DVB Document A111 Rev. 1, Jul. 2007, Digital Video Broadcasting, Framing Structure, channel coding and modulation for Satellite Services to Handheld devices (SH) below 3 GHz.

International Search Report and the Written Opinion of the International Searching Authority in PCT/US2009/063192, Alcatel-Lucent USA Inc., Applicant, mailed Feb. 11, 2010, 15 pages.

Hui-Ling Lou et al: "FEC Scheme for a TDM-OFDM Based Satellite Radio Broadcasting System" IEEE Transactions on Broadcasting, IEEE Service Center, Piscataway, NJ, US, vol. 46, No. 1, Mar. 1, 2000.

Office Action mailed Oct. 9, 2012 in JP Patent Application No. 2011-534894, Alcatel-Lucent USA Inc., Applicant, 3 pages.

Office Action mailed Feb. 4, 2013 in CN Patent Application No. 200980144381.8, Alcatel-Lucent USA Inc., Applicant, 6 pages.

* cited by examiner

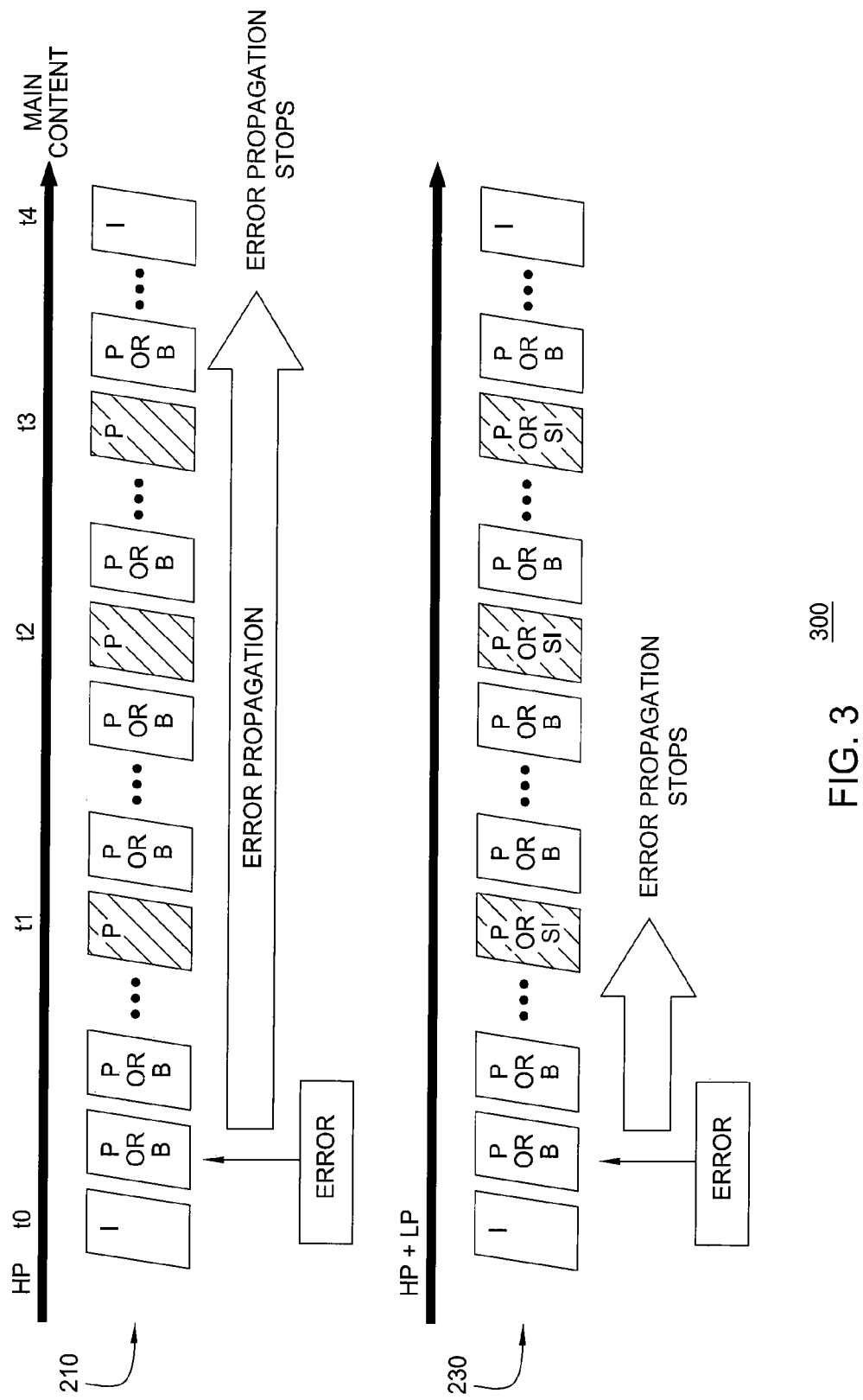

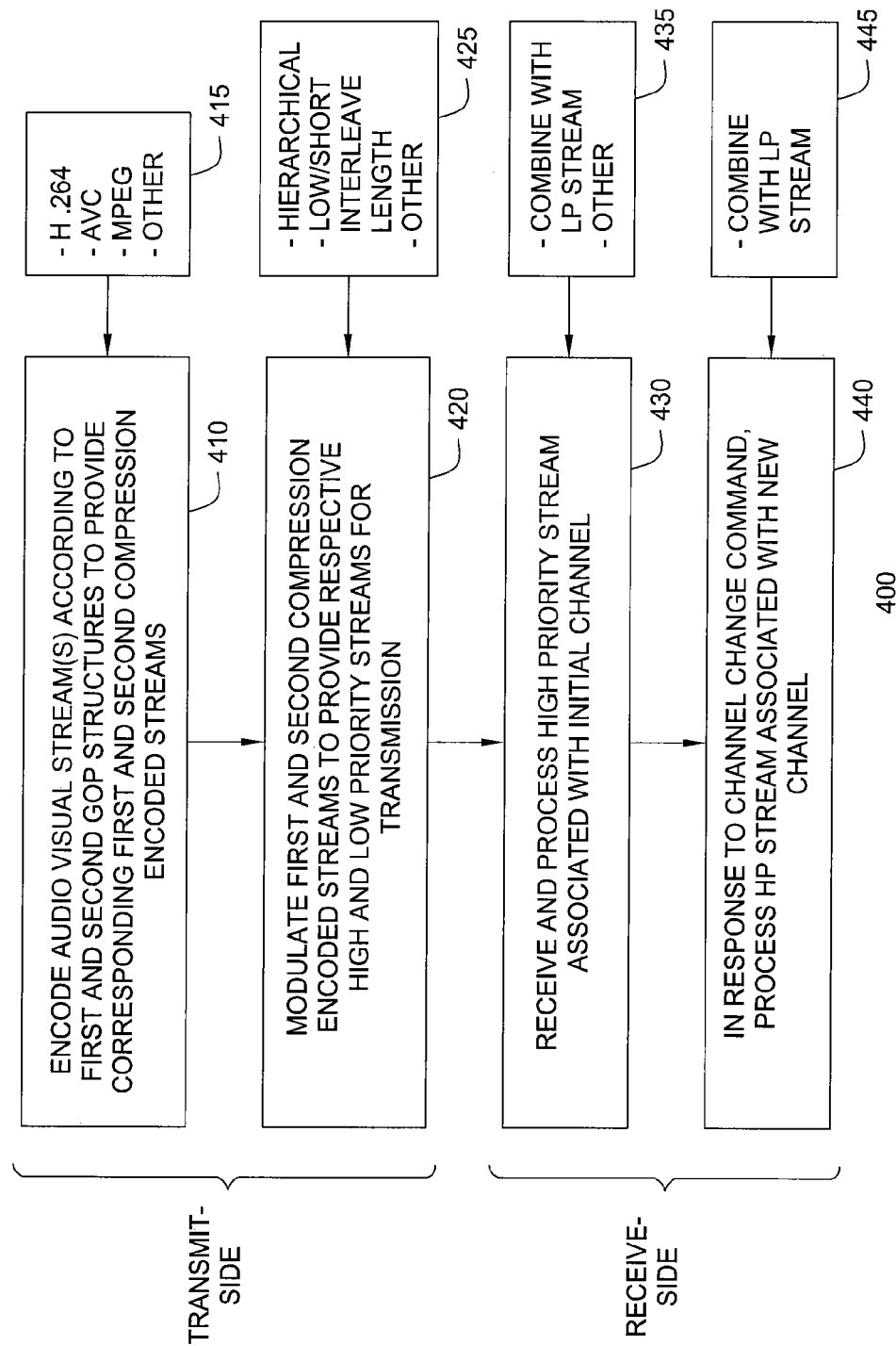

METHOD AND APPARATUS FOR FAST CHANNEL CHANGE

FIELD OF THE INVENTION

The present invention generally relates to digital video broadcast systems and, in particular, digital video broadcast systems facilitating a rapid channel change function.

BACKGROUND

In digital video broadcast systems it is desirable to provide a fast channel change mechanism to reduce the time it takes for a user to switch from one channel to another. Channel change time is usually very long, usually more than 10 seconds in mobile video broadcast applications.

The existing solutions to fast channel change use additional bits to provide a low resolution of the video that somehow can be displayed sooner than the normal video content. The existing solutions have drawback of wasting the low solution video bits, once the channel change is made. In addition, the existing solutions require changes to existing systems (i.e., no backward compatibility) to provide the fast channel change feature, and such changes will require new receivers to work in the new system.

BRIEF SUMMARY

Various deficiencies of the prior art are addressed by the present invention of systems, apparatus and methods for reducing the amount of time needed to change channels within a digital video broadcast system. Specifically, various embodiments provide a fast channel change function in a digital television system by hierarchically modulating each channel to provide both high priority (long interleave) and low priority (short interleave) signals, wherein a receiver may rapidly demodulate and use information within the low priority signal of a new channel to more rapidly change to the new channel.

In one embodiment, a system for compression encoding each of a plurality of audiovisual streams according to a first group of pictures (GOP) structure to provide thereby respective first compression encoded streams includes a method comprising: compression encoding the audiovisual streams according to a second GOP structure to provide thereby respective second compression encoded streams; wherein the number of frames forming the second GOP structure is fewer than the number of frames forming the first GOP structure; the second GOP structure frames are temporally aligned with frames in the corresponding first GOP structure; and the second compression encoded streams are adapted to enable a receiving device to rapidly transition between first compression encoded streams.

In another embodiment, an apparatus comprises an encoder, for encoding each of a plurality of audiovisual streams according to each of a first group of pictures (GOP) structure and a second GOP structure to provide thereby a plurality of corresponding first and second compression encoded streams; and a modulator, for modulating each of the first compression encoded streams to provide respective high priority streams and for modulating each of the second compression encoded streams to provide thereby respective low priority streams; wherein the low priority streams are adapted to enable a receiving device to rapidly transition between high priority streams.

BRIEF DESCRIPTION OF THE DRAWINGS

The teachings of the present invention can be readily understood by considering the following detailed description in conjunction with the accompanying drawings, in which:

FIG. 3 graphically depicts group of picture (GOP) structures for an improved video quality embodiment; and FIG. 4 depicts a flow diagram of a method according to one embodiment.

To facilitate understanding, identical reference numerals have been used, where possible, to designate identical elements that are common to the Figures.

DETAILED DESCRIPTION OF THE INVENTION

Figure 1:
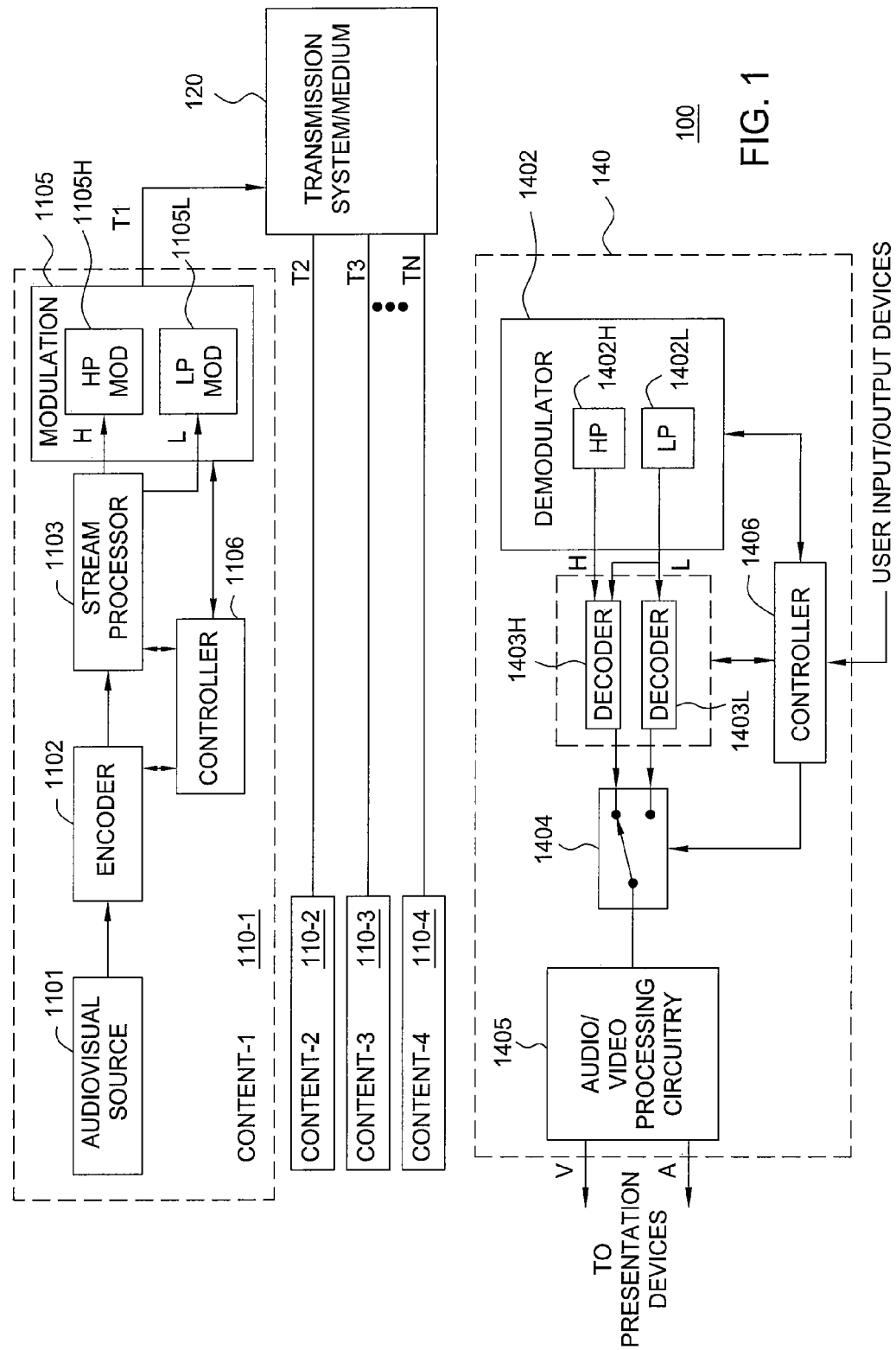
FIG. 1 depicts a block diagram of a system according to one embodiment.

The invention will be primarily described within the context of a mobile video broadcast system exhibiting specific characteristics that are addressed by the various embodiments. However, those skilled in the art and informed by the teachings herein will realize that the invention is applicable to other encoding/decoding systems in which more rapid changes between streams being decoded is desired.

The inventors have observed that a relatively long interleaver is often used within the context of the physical layer and/or link layer of a mobile video broadcast system to combat deep fading or blockage (for example, while a vehicle is passing through a short tunnel or an overpass) of the transmitted signal. While the long interleave time provides for a more robust receiver, transmit information provided using a long interleave time also requires more time to process at the receiver. In addition, mobile video broadcast systems typically use a group of pictures (GOP) structure in which I-frames (i.e., intra-coded video frames) are transmitted infrequently to reduce the bit rate necessary to support a high-quality video stream. This infrequent transmission of-frames leads to a problem; namely, long waiting times to switch channels since the decoding/processing of a new channel must start at an l-frame within the new channel.

Various embodiments advantageously provide one or more of improved channel change time, improved playback performance where loss of signal occurs, and reduced time (i.e., persistence) of errors experienced by decoders.

Briefly, in one embodiment, the high priority encoded stream comprises encoded programming including video and audio frames having a relatively standard group of pictures (GOP) structure. This high priority or main content stream carries normal programming encoded as intra-coded frames (I-frames), predictably coded frames (P-frames), bidirectionally coded frames (B-frames) and, optionally, SP and/or SI frames (such as defined in the H.264 specifications). The high priority or main content stream also includes audio frames to provide the audio data. The high priority or main content stream generally lacks the fast channel change capability discussed herein, and is adapted to be decoded by standard decoding circuitry. The low priority or fast zapping content stream carries reduced resolution programming encoded as, illustratively, SI frames (optionally including I-frames or other frame types). The SI frames of the low priority or fast zapping content stream are, in one embodiment, temporally aligned with the I-frames and as P-frames respectively of the high priority or main content stream such that replacement of HP stream frames with LP stream frames is substantially seamless. SI frames are discussed in the ITU-T and ISO/IEC JTC 1, Advanced Video Coding for Generic Audiovisual services, ITU-T Recommendation, H.264-ISO/IEC 14496-10 (AVC), 2003, which is incorporated herein by reference in its entirety.

The various embodiments benefit from (and contribute to) the digital video broadcasting (DVB) standards, such as Framing structure, channel coding and modulation for digital terrestrial television; ETSI EN 300 744 V1.5.1 (2004-11), and Framing Structure, channel coding and modulation for Satellite Services to Handheld devices (SH) below 3 GHz; DVB Document A111 Rev. 1, July 2007; DVB BlueBook A111 Rev. 1, which are incorporated herein by reference in their entireties.

Thus, various embodiments comprise a system method and/or apparatus providing fast channel change wherein a first stream is sent by HP of hierarchical modulation, and a second stream is sent by LP of the hierarchical modulation, and one of them is used for fast decoding to provide the fast channel change. These embodiments do not necessarily need to be associated with SI frames or any particular GOP structure in the LP stream. Generally speaking, the LP stream of the hierarchical modulation is used for fast channel change irrespective of the particular construction of the LP stream.

FIG. 1 depicts a block diagram of a system including components according to one embodiment. Specifically, the system 100 of FIG. 1 comprises a plurality of content stream sources 110-1, 110-2, 110-3 and so on up to 110-N (collectively content stream sources 110), a transmission system/medium 120 and a receiver 140. It will be noted that only one receiver 140 is depicted in FIG. 1. However, the system including multiple receivers 140 is contemplated by the inventors.

Each of the content stream sources 110 is associated with an audiovisual signal source 1101, an encoder 1102, a stream processor 1103, a modulator 1105 and an optional controller 1106. Each of the content stream sources 110 provides high priority and low priority modulated streams suitable for transmission toward one of more receivers 140 via the transmission system/medium 120. The optional controller 1106 adapts the operation of the encoder 1102, stream processor 1103 and modulator 1105 as necessary in conformance with the present embodiment. In various embodiments the encoder 1102, stream processor 1103 and modulator 1105 operate according to the invention and without the use of a controller 1106. The controller 1106 comprises at least one processor, various support circuitry, input-output (I/O) circuitry, memory, communication buses and so on for receiving, processing, providing and/or exchanging information in accordance with the various embodiments.

The audiovisual signal source 1101 provides video, audio and other signals/streams associated with content, such as a television program, movie and the like. The audiovisual signal source 1101 may be proximate or remote with respect to the content stream source 110. For example, the audiovisual signal source 1101 may comprise a network television feed received from a remote satellite link, a movie streamed from a local server and so on. The audiovisual signal source 1101 provides unencoded audiovisual information (e.g., video, audio and/or other information) to the encoder 1102.

The encoder 1102, illustratively an H.264 encoder, operates to encode the unencoded audiovisual information. Other encoding standards may also be advantageously be employed within the context of the present embodiments, such as the MPEG standards (e.g., MPEG-4 part 10), AVC standard and so on. The specific use of SI frames (defined in H.264) is merely one embodiment. Generally speaking, the invention provides for the transmission in the LP stream of additional information (e.g., SI frames) which can be used quickly to produce an audiovisual signal for fast channel change. Preferably, the same information is able to be combined with the information in the HP stream to enhance the audiovisual signal of the main content. The encoder 1102 may comprise one or more encoders. The encoder 1102 and stream processor 1103 cooperate with each other to produce two encoded content streams; namely, an encoded high priority content stream (H) and an encoded low priority content stream (L).

The encoded high and low priority content streams will be discussed in more detail below with respect to FIGS. 2 and 3. Briefly, in one embodiment, the high priority encoding stream comprises normal resolution encoded programming which may be decoded and otherwise processed by a standard receiving/decoding device. In this embodiment, the low priority programming includes low frame rate encoded programming. The group of pictures (GOP) structure of the high priority encoding stream includes more frames than are included within the low priority encoding stream. In one embodiment, both high and low priority encoding streams include substantially the same audio data in various embodiments. In one embodiment, only the HP stream includes audio.

The high priority and low priority content streams are modulated by, respectively, high-priority modulator 1105H and a low priority modulator 1105L within modulator 1105 for subsequent transmission via the transmission system/medium 120.

The receiver 140 is associated with a demodulator 1402, high-priority decoder 1403H, a low priority decoder 1403L, a switching mechanism 1404, audio/video processing circuitry 1405 and the controller 1406.

The demodulator 1402 comprises a high priority stream demodulator 1402H and a low priority stream demodulator 1402L. The HP demodulator 1402H operates to demodulate a high priority encoded stream received via the transmission system/medium 120 to provide thereby a high priority encoded stream H. The LP demodulator 1402L operates to demodulate a low priority encoded stream received via the transmission system/medium 120 to provide thereby a low priority encoded stream L.

The high priority encoded stream H is decoded by the high priority decoder 1403H to provide thereby a high priority decoded stream. The low priority encoded stream L is decoded by the low priority decoder 1403L to provide thereby a low priority decoded stream. The decoders comprise, illustratively, H.264 decoders substantially as described herein.

The switching mechanism 1404, in response to a selection signal SELECT provided by the controller 1406, provides one of the high priority decoded stream and the low priority decoded stream to the audio/video processing circuitry 1405.

The audio/video processing circuitry 1405 processes the decoded stream to provide video V and audio A signals suitable for use by a presentation device, such as a television, computer monitor and/or other display a presentation device.

The controller 1406 comprises at least one processor, various support circuitry, input-output (I/O) circuitry, memory, communication buses and so on for receiving, processing, providing and/or exchanging information in accordance with the various embodiments. The controller 1406 interacts with various user input/output devices (not shown) to receive user commands such as "change channel" and other commands. In response to these commands, the controller 1406 adapts the operation of what a more of the switching mechanism 1404, decoders 1403 and demodulator 1402 to implement the desired user action.

Figure 2:
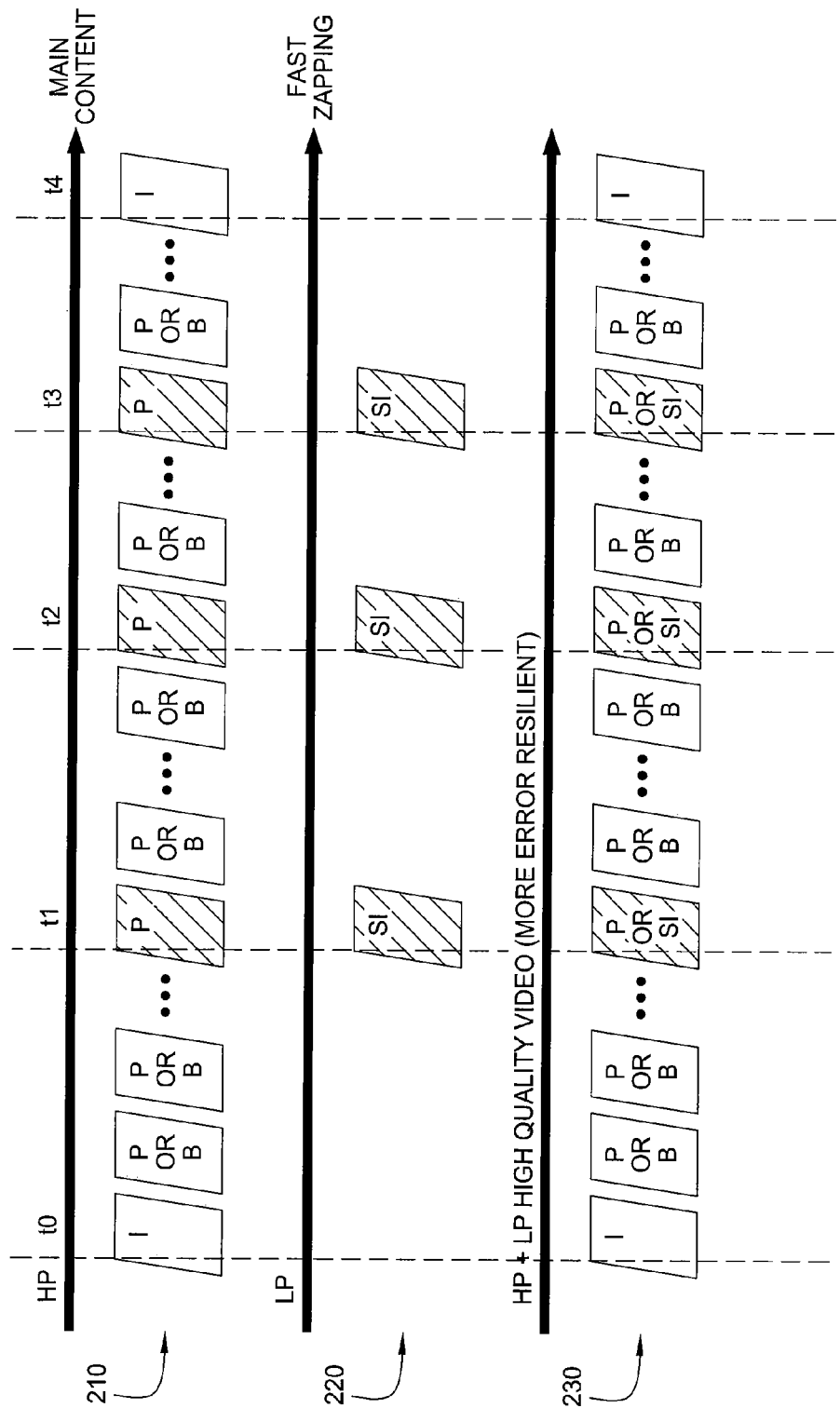
FIG. 2 graphically depicts group of picture (GOP) structures for high priority and low priority streams according to one embodiment.

FIG. 2 graphically depicts group of picture (GOP) structures for high priority and low priority streams according to one embodiment. Specifically, depicts a high priority HP stream 210 (denoted as "main content"), a low priority LP stream 220 (denoted as "fast zapping") and a combined high priority plus low priority (HP+LP) stream 230. The three streams are displayed in a temporally aligned manner including five time periods, denoted as t0-t4.

HP stream 210 is the stream provided by stream processor 1103 to modulator 1105H. HP stream 210 comprises a GOP structure in which an initial I-frame is provided at the beginning of time period t0, an SP-frame is provided at the beginning of time periods t1, t2 and t3, with a plurality of P- or B-frames separating the I-frame and SP-frames. That is, each of the time periods begins with one of an I-frame or SP-frame and includes a plurality of P- or B-frames. The start of a next GOP is indicated by the I-frame provided at the beginning of time period t4.

LP stream 220 is the stream provided by stream processor 1103 to modulator 1105L. LP stream 220 comprises a GOP structure in which an SI-frame is provided at the beginning of time periods t1, t2 and t3, with no other frames separating the SP-frames. That is, each of the time periods begins with an SI-frame and includes no other frames. In an alternate embodiment, an I-frame is included in the LP stream at the beginning of time period t0. In still another embodiment, to conserve bandwidth this I-frame is a reduced spatial resolution frame and/or a reduced spectral content frame.

Combined stream 230 represents a combination of HP stream 210 and SP stream 220 as reconstructed by receiver 140. Combined stream 230 comprises a GOP structure in which each of the SI-frames in LP stream 220 replaces a P or SP-frame in HP stream 210. In an embodiment using the combined stream 230, improved video quality is provided due to improved error resilience. The improved error resilience is graphically depicted in FIG. 3.

Combined stream 230 is formed at the receiver by replacing the SP-frames within the HP stream with temporally corresponding SI-frames from the LP stream. In this manner, additional data included within the LP stream is utilized to improve the quality of service rendered to a user via the HP stream. Similarly, disruptions to the HP stream such as frame errors induced by transmission errors and the like last only one time period, rather than the four time periods associated with the GOP structure of the present example. It will be noted by those skilled in the art that any GOP structure including an initial I=frame and intermediate SP-frame benefits from this embodiment.

FIG. 3 graphically depicts group of picture (GOP) structures for an improved video quality embodiment. Specifically, FIG. 3 graphically depicts the effect of an error on each of the HP stream 210 and combined stream 230 discussed above with respect to FIG. 2. Referring to FIG. 3, in the event of an error at the second frame of HP stream 220, the error propagates through all of the predictably encoded frames of the GOP until the next I-frame (at time period t4). By contrast, in the event of the same error at the second frame of combined stream 230, the error propagates only until the next SI-frame.

Thus, in one embodiment, improved error resiliency including resiliency to disruptions caused by channel changing is provided by using an HP stream and an LP stream, wherein SI-frames within the LP stream are used to replace temporally corresponding frames in the HP stream.

In this embodiment of the invention, hierarchical modulation is used to enable a fast channel change feature. Specifically, high quality video content is transmitted in an HP layer of the hierarchically modulated signal, and low quality video content as well as additional bits that can be decoded with minimum delay in support a fast channel change feature are transmitted in an LP layer of the hierarchically modulated signal. In one embodiment, additional bits are transmitted in the LP layer that is used to provide error resilience and, thereby, improve the video quality. The embodiment also employs the special features of SP-frames and SI-frames of the H.264 video coding standard.

There are several advantages to this embodiment. First, the bits that are used to provide fast channel change are not wasted after the channel change is made. These bits are also used to provide error resilience in the video after the channel change. Secondly, the quality of service is enhanced due to increased error resilience. Thirdly, the system with the fast channel change feature is backward compatible. There is no need to replace existing, deployed receivers. The old receiver will continue to provide normal video service without the fast channel change feature. The new receivers will have the fast channel change feature, with the added benefit of higher video quality.

In another embodiment of the invention, the normal programming has a bit rate of 4.94 Mbps. Parameters associated this embodiment depicted below with respect to Table 1. The HP stream provides the same programming with same bit rate, but it requires 1.7 dB more C/N to achieve the same BER. The LP stream contains I and SI frames, as well as audio data, with total bit rate of 1.48 Mbps. This bit rate provides twice as many I or SI frames as in HP. Therefore, in the combined HP and LP stream, error propagation duration is, on average, half of that in the HP stream. To achieve BER≤$10^{-5}$ for LP, the required C/N is 6.5 dB, which is 3 dB higher than the baseline system. In this embodiment, where SI frames are used the number of SI frames transmitted in LP stream are about twice as many as the I-frames transmitted in the HP stream.

TABLE 1

| Parameters | Baseline system Satellite | Hierarchical system Terrestrial | |
|---|---|---|---|
| | | HP | LP |
| Content | Global | Global | Local |
| Constellation | QPSK | 16-QAM | |
| Hierarchical parameter (alpha) | N/A | 2 | |
| Bandwidth | 5 MHz | 5 MHz | |
| FFT size | 2K | 2K | |
| Guard interval | 1/8 | 1/8 | |
| Code rate | 2/3 | 2/3 | 2/9 |
| MPEG-TS throughput (Mbps) | 4.94 | 4.94 | 1.65 |
| Required C/N (AWGN) (dB) | 3.5 | 5.2 | 7.1 |
| Penalty w.r.t. Baseline (dB) | — | 1.7 | 3.6 |

TABLE 2

| Parameters | Baseline system without fast zapping | Hierarchical system with Fast Zapping | |
|---|---|---|---|
| | | HP | LP |
| Service | Main video | Main video | Fast zapping and error resilience |
| Constellation | QPSK | 16-QAM | |
| Hierarchical parameter (alpha) | N/A | 2 | |
| Bandwidth | 5 MHz | 5 MHz | |
| FFT size | 2K | 2K | |
| Guard interval | 1/8 | 1/8 | |
| Code rate | 2/3 | 2/3 | 1/3 |

TABLE 2-continued

| Parameters | Baseline system without fast zapping | Hierarchical system with Fast Zapping | |
| --- | --- | --- | --- |
| | | HP | LP |
| Interleaver length | Long | Long | Short |
| MPEG-TS throughput (Mbps) | 4.94 | 4.94 | 1.48 |
| Audio bits (Mbps) | 0.35 | 0.35 | 0.35 |
| I or (SI)-frame bits (Mbps) | 0.60 | 0.60 | 1.13 |
| P(B)-frames and other service bits (Mbps) | 3.99 | 3.99 | — |
| Required C/N (AWGN) (dB) | 3.5 | 5.2 | 6.5 |
| Penalty w.r.t. Baseline (dB) | — | 1.7 | 3 |

Table 1 tabulates various data points associated with a baseline system that does not use the various embodiment discussed herein. Table 1 is presented as a baseline comparison to the tabulated data of Table 2, which does use various embodiments. Referring to Table 2, both the HP stream and the LP stream are transmitted using a 16-QAM constellation occupying 5 MHz of bandwidth. However, the HP stream has a code rate of ⅔ with a long interleaver length, while the LP stream has a code rate of ⅕ with a short interleaver length. The short interleaver length means that individual frames may be more quickly demodulating by the demodulators 1402 of the receiver 140, enabling thereby more rapid correction of errors such as errors induced by channel change operations. The LP stream provides "fast zapping" or rapid channel change functionality at the expense of some minor penalties.

In one embodiment of the invention, hierarchical modulation is used to enable a fast channel change feature. In this embodiment, high quality video content is transmitted in the HP layer of the hierarchical modulation, and the LP layer is used to transmit additional bits that can be decoded with minimal delay to provide fast channel change feature. Furthermore, the bits that are transmitted in the LP layer are also used to provide error resilience and hence improve the video quality. The solution also employs the special features of SP-frames and SI-frames of the H.264 video coding standard.

There are three advantages. First, the bits that are used to provide fast channel change are not wasted after the channel change is made. Second, in some embodiments these bits are also used to provide error resilience in the video after the channel change to provide enhanced the video quality. Third, the system with the fast channel change feature is backward compatible. There is no need to replace existing, deployed receivers. The old receiver will continue to provide normal video service without the fast channel change feature. The new receivers will have the fast channel change feature, with the added benefit of higher video quality.

FIG. 4 depicts a flow diagram of a method according to one embodiment. Specifically, the method 400 of FIG. 4 depicts several implementations of the above-described embodiments. The method 400 of FIG. 4 comprises transmitter side steps (410-425) and receiver side steps (430-445).

At step 410 one or more audiovisual streams are encoded according to first and second GOP structures to provide thereby corresponding first and second compression encoded streams. Referring to box 415, the encoder may conform to any of the H.264, AVC, MPEG or other compression encoding standards or techniques.

At step 420, each of the corresponding first and second compression encoded streams are modulated to provide respective high and low priority streams for transmission via a medium, such as a wireless, wired and/or optical medium.

Referring to box 425, the modulation may be hierarchical such that the high and low priority streams are related/scalable at the receiver. The modulation may also provide for a relatively long interleaver length for the high priority stream and a relatively short interleaver length for the low priority stream.

At step 430, a high priority stream associated with an initial channel is received and processed. That is, the high priority stream including a compressed audiovisual stream associated with initial television channel is received and processed by, for example, a mobile receiver and a wireless digital television system, a set-top box (STB) or other television processing device. Typically the processing includes the generation of presentation-enabling signals for use by a display device.

Referring to box 435, the high priority stream may be combined with the low priority stream to provide an HP+LP stream as previously described. Other processing techniques may also be used, such as simultaneously processing the LP stream for use in a subsequent stream transition or channel change operation. In some embodiments of the frames within the LP stream are aligned with frames within the HP stream. This alignment may be based upon presentation timestamp (PTS) or other temporal information. In other embodiments the frames within the LP stream are not aligned with frames within the HP stream.

At step 440, in response to a channel change command received from a user, the receiver begins processing the LP/HP streams associated with a desired new channel. Referring to box 445, the receiver optionally processes a combined HP/LP stream associated with the desired new channel. As previously noted, by processing a combined HP/LP stream the duration of any error propagating through a GOP is reduced.

In one embodiment, in response to the channel change command the receiver begins processing the LP stream associated with the new channel. This processing may comprise demodulating the LP stream to extract therefrom compressed frames and/or other data useful in effecting a fast channel change. In one embodiment, the receiver combines the extracted LP stream frames with the frames of the demodulated HP stream associated with the new channel to provide a combined HP/LP stream. Generally speaking, the embodiments utilized the rapid demodulation of the LP stream (due to the short interleaver and/or reduced bit rate used to modulate the LP stream) to provide interim information to the receiver decoders and assist in the fast channel change from the existing channel to the new channel.

The methodology discussed herein with respect to FIG. 4 provides at the receiver rapid channel-changing by, in various embodiments, the hierarchical encoding of the HP and LP streams, the use of a relatively long and relatively short interleaver lengths, the use of GOP structures in which LP frames may be used to replace HP frames and so on.

In one embodiment, a receiver comprises a demodulator comprising a high priority (HP) demodulator and a low priority (LP) demodulator for respectively demodulating channel information received via hierarchically encoded high priority (HP) and corresponding low priority (LP) streams to provide thereby encoded channel content. The encoded HP streams are associated with a relatively long interleaver length, while encoded LP streams are associated with a relatively short interleaver length. The receiver includes a decoder, for decoding the encoded channel content to provide thereby decoded channel content. In response to a channel change command, the LP demodulator begins processing an LP stream associated with a desired new channel to extract therefrom information supporting a rapid change from an existing channel to the desired new channel. The information may comprise video frames, audio frames, auxiliary/ancillary information and the like. In one embodiment, the HP modulated streams include content encoded according to a first group of pictures (GOP) structure, the LP modulated streams include content encoded according to a second GOP structure, the second GOP structure including fewer frames than the first GOP structure.

In one embodiment, each of a plurality of content streams (channels) is hierarchically modulated to produce respective high priority (HP) modulated content streams having relatively long interleaver lengths and corresponding low priority (LP) modulated content streams having relatively short interleaver lengths. Each of the corresponding HP and LP modulated content stream pairs provides content associated with a particular channel. The HP/LP modulated content stream pairs are adapted to facilitate at a receiver or a fast change from existing channel to a desired/next channel.

In one embodiment, the LP stream has only video. In another embodiment, the LP stream has only audio. In another embodiment, the LP stream has both audio and video. Any of these embodiment, the LP stream optionally includes additional data useful in effecting a channel or stream transition, such as indicators of appropriate splicing points, scene changed indicators and the like.

The controllers 1106 and 1406 comprise at least one processor, various support circuitry, input-output (I/O) circuitry, memory, communication buses and so on for receiving, processing, providing and/or exchanging information. The at least one processor may be any conventional processor for executing programs or software instructions stored in memory. The memory may be any conventional volatile memory (e.g., RAM, DRAM, among others), non-volatile memory (e.g., disk drives, floppy, drives, CDROM, EPROMS, among other computer readable medium) or any other conventional memory device for storing data and various control programs, such as methodology according to the present invention. The processor cooperates with conventional support circuitry, such as power supplies, clock circuits, cache memory and the like, as well as circuits that assist in executing the various programs and routines, as well as other programs and data. As such, it is contemplated that some of the process steps discussed herein as software processes may be implemented within hardware, for example, as circuitry that cooperates with the processor to perform various steps. The input/output (I/O) circuitry forms an interface between the various functional elements communicating with each network element.

Although the controllers (as well as other processing and/or network elements described herein) are depicted as general-purpose computers that are programmed to perform various control functions in accordance with the present invention, the invention can be implemented in hardware such as, for example, an application specific integrated circuit (ASIC). As such, it is intended that the processes described herein be broadly interpreted as being equivalently performed by software, hardware, or a combination thereof.

The invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, and/or stored within a working memory within a computing device operating according to the instructions.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A method in a system for compression, the method comprising:
   encoding each of a plurality of audiovisual streams according to a first group of pictures (GOP) structure to provide thereby respective first compression encoded streams; and
   compression encoding the audiovisual streams according to a second GOP structure to provide thereby respective second compression encoded streams;
   wherein a number of frames forming the second GOP structure is fewer than a number of frames forming the first GOP structure;
   wherein the second compression encoded streams are adapted to enable a receiving device to rapidly transition between the first compression encoded streams to thereby enable a fast channel change;
   wherein said enabling at the receiving device comprises temporally replacing corresponding frames in the first compression encoded streams with corresponding frames from the second compression encoded streams to provide a combined GOP structure.

2. The method of claim 1, wherein each of corresponding first and second compression encoded stream pairs is associated with a respective channel, wherein the transitioning between the first compression encoded streams comprises a channel changing function at a receiver.

3. The method of claim 1, wherein the second GOP structure frames comprise SI frames.

4. The method of claim 3, wherein the second GOP structure frames are aligned with SP frames within the first GOP structure.

5. The method of claim 1, wherein the second GOP structure frames are temporally aligned with frames in the corresponding first GOP structure.

6. The method of claim 1, wherein the encoding conforms to an H.264 standard.

7. The method of claim 1, wherein the first and second compression encoded streams include common encoded audio frames.

8. The method of claim 1, further comprising:
   transmission modulating the first compression encoded streams using a relatively long interleaver length; and
   transmission modulating the second compression encoded streams using a relatively short interleaver length.

9. The method of claim 8, wherein the modulation of the first and second compression encoded streams comprises a hierarchical modulation.

10. An apparatus, comprising:
    an encoder, for encoding each of a plurality of audiovisual streams according to each of a first group of pictures (GOP) structure and a second GOP structure to provide thereby a plurality of corresponding first compression encoded streams and a plurality of corresponding second compression encoded streams; and
    a modulator, for modulating each of the first compression encoded streams to provide respective high priority streams and for modulating each of the second compression encoded streams to provide thereby respective low priority streams;
    wherein the low priority streams are adapted to enable a receiving device to rapidly transition between the high priority streams to thereby enable a fast channel change;

wherein said enabling at the receiving device comprises temporally replacing corresponding frames in the high priority streams with corresponding frames from the low priority streams to provide a combined GOP structure.

11. The apparatus of claim 10, wherein each of said high priority streams and said low priority streams are adapted for transmission toward mobile television receivers.

12. The apparatus of claim 11, wherein:
a number of frames forming the second GOP structure is fewer than a number of frames forming the first GOP structure; and
the second GOP structure frames are temporally aligned with frames in the corresponding first GOP structure.

13. The apparatus of claim 10, wherein each high priority stream or corresponding low priority stream is associated with a common television channel.

14. The apparatus of claim 10, wherein the modulator uses a relatively long interleaver length for modulating each of the first compression encoded streams and a relatively short interleaver length for modulating each of the second compression encoded streams.

15. The apparatus of claim 14, wherein the modulator is configured to provide a hierarchical modulation of corresponding first and second compression encoded streams.

16. A receiver apparatus, comprising:
a demodulator comprising a high priority (HP) demodulator and a low priority (LP) demodulator for respectively demodulating channel information received via hierarchically encoded high priority (HP) and corresponding low priority (LP) streams to provide thereby encoded channel content, the encoded HP streams being associated with a relatively long interleaver length, the encoded LP streams being associated with a relatively short interleaver length; and
a decoder, for decoding the encoded channel content to provide thereby decoded channel content;
wherein the LP demodulator is configured to, in response to a channel change command, begin processing one of the encoded LP streams associated with a desired new channel to extract therefrom information supporting a fast channel change from an existing channel to the desired new channel;
wherein the encoded HP streams include content encoded according to a first group of pictures (GOP) structure;
wherein each of the encoded LP streams includes frames which are configured to quickly produce a signal for the fast channel change; and
wherein said receiver is configured to replace temporally corresponding frames in the corresponding encoded HP streams with frames from the corresponding encoded LP streams to provide thereby a combined GOP structure.

17. The receiver of claim 16, wherein:
each of the encoded LP streams includes content encoded according to a second GOP structure;
the second GOP structure includes fewer frames than the first GOP structure; and
said decoder is configured to combine the first GOP structure and the second GOP structure to provide thereby said combined GOP structure.

18. A non-transitory computer readable storage medium for storing instructions which, when executed by a processor, perform a method comprising:
hierarchically modulating each of a plurality of content streams to produce respective high priority (HP) modulated content streams having relatively long interleaver lengths and corresponding low priority (LP) modulated content streams having relatively short interleaver lengths, each corresponding HP and LP modulated content stream providing content associated with a particular channel, the HP and LP modulated content streams being independently decoded and adapted to facilitate a fast channel change function in a receiving device;
wherein each of the HP modulated content streams includes content encoded according to a first group of pictures (GOP) structure;
wherein each of the LP modulated content streams includes frames which can be used to quickly produce a signal for a fast channel change;
wherein said adaptation of the HP and LP modulated content streams after being independently decoded comprises temporally replacing corresponding frames in the corresponding HP modulated content streams with frames from the corresponding LP modulated content streams to provide thereby a combined GOP structure.

19. The non-transitory computer readable storage medium of claim 18, wherein:
the HP modulated content streams include content encoded according to a first group of pictures (GOP) structure, the LP modulated content streams include content encoded according to a second GOP structure, and the second GOP structure includes fewer frames than the first GOP structure.

20. The non-transitory computer readable storage medium of claim 19, wherein the first and second GOP structures are adapted to be combined to provide thereby the combined GOP structure.

21. The non-transitory computer readable storage medium of claim 20, wherein the first GOP structure includes an initial I-frame and at least one SD-frame, the second GOP structure includes at least one SI-frame, and the combined GOP structure comprises the first GOP structure wherein at least one SD-frame is replaced by a corresponding SI-frame from the second GOP structure.

22. A method for compression encoding each of a plurality of content streams, the method comprising:
hierarchically modulating each of the plurality of content streams to produce respective high priority (HP) modulated content streams having relatively long interleaver lengths and corresponding low priority (LP) modulated content streams having relatively short interleaver lengths, each corresponding HP and LP modulated content stream providing content associated with a particular channel, the HP and LP modulated content streams being independently decoded and adapted to facilitate a fast channel change function in a receiving device, wherein:
each of the HP modulated content streams includes content encoded according to a first group of pictures (GOP) structure;
each of the LP modulated content streams includes frames which can be used to quickly produce a signal for a fast channel change; and
said adaptation of the HP and LP modulated content streams after being independently decoded comprises temporally replacing corresponding frames in the corresponding HP modulated content streams with frames from the corresponding LP modulated content streams to provide thereby a combined GOP structure.

23. The method of claim 22, wherein the content streams are audiovisual streams and each of the plurality of audiovisual streams is compression encoded according to the first GOP structure to provide thereby respective first compression encoded streams, the method comprising:

compression encoding the audiovisual streams according to a second GOP structure to provide thereby respective second compression encoded streams;

wherein a number of frames forming the second GOP structure is fewer than a number of frames forming the first GOP structure;

wherein the second compression encoded streams are adapted to enable the receiving device to rapidly transition between the first compression encoded streams.

24. The method of claim 23, wherein each of corresponding first and second compression encoded stream pairs is associated with a respective channel, wherein the transitioning between the first compression encoded streams comprises the fast channel change from an existing channel to a desired channel.

25. The method of claim 23, wherein the second GOP structure frames comprise SI frames.

26. The method of claim 23, wherein the second GOP structure frames are temporally aligned with the corresponding first GOP structure frames.

27. The method of claims 23, wherein the encoding conforms to an H.264 standard.

28. An apparatus, comprising:

an encoder, configured to encode a plurality of content streams; and a modulator, configured to hierarchically modulate each of the plurality of content streams to produce respective high priority (HP) modulated content streams having relatively long interleaver lengths and corresponding low priority (LP) modulated content streams having relatively short interleaver lengths, each corresponding HP and LP modulated content stream providing content associated with a particular channel, the HP and LP modulated content streams being independently decoded and adapted to facilitate a fast channel change function in a receiving device;

wherein each of the HP modulated streams includes content encoded according to a first group of pictures (GOP) structure;

wherein each of the LP modulated streams includes frames which can be used to quickly produce a signal for a fast channel change;

wherein said adaptation of the HP and LP modulated content streams after being independently decoded comprises temporally replacing corresponding frames in the corresponding HP modulated content streams with frames from the corresponding LP modulated content streams to provide thereby a combined GOP structure.

29. The apparatus of claim 28, wherein:

the LP modulated content streams include content encoded according to a second GOP structure, the second GOP structure including fewer frames than the first GOP structure; and the first and second GOP structures are adapted to be combined to provide thereby the combined GOP structure using the frames from the corresponding LP modulated content streams to replace temporally corresponding frames in the corresponding HP modulated content streams.

30. The apparatus of claim 29, wherein:

the second GOP structure frames are temporally aligned with frames in the corresponding first GOP structure.

31. The apparatus of claim 28, wherein the first GOP structure includes an initial I-frame and at least one SP-frame, the second GOP structure includes at least one SI-frame, and the combined GOP structure comprises the first GOP structure wherein at least one SP-frame is replaced by a corresponding SI-frame from the second GOP structure.

32. The apparatus of claim 28, wherein each HP modulated content stream and each corresponding LP modulated content stream are associated with a common television channel.

33. The apparatus of claim 28, wherein the LP modulated content streams contain audio.

* * * * *